(12) United States Patent
Kincaid et al.

(10) Patent No.: US 12,405,150 B2
(45) Date of Patent: *Sep. 2, 2025

(54) DEVICES, SYSTEMS, AND METHODS FOR MEASURING FLUID LEVEL USING RADIO-FREQUENCY (RF) LOCALIZATION

(71) Applicant: Aloft Sensor Technologies LLC, Indianapolis, IN (US)

(72) Inventors: Ryan Kincaid, Indianapolis, IN (US); David Brown, New Palestine, IN (US)

(73) Assignee: Aloft Sensor Technologies LLC, Indianapolis, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/439,972

(22) Filed: Feb. 13, 2024

(65) Prior Publication Data
US 2024/0344874 A1 Oct. 17, 2024

Related U.S. Application Data

(63) Continuation of application No. 17/672,581, filed on Feb. 15, 2022, now Pat. No. 11,898,892, which is a
(Continued)

(51) Int. Cl.
*G01F 23/68* (2006.01)
*G01F 23/284* (2006.01)
*G01F 23/80* (2022.01)

(52) U.S. Cl.
CPC .......... *G01F 23/284* (2013.01); *G01F 23/802* (2022.01)

(58) Field of Classification Search
CPC .......... G01F 23/56; G01F 23/60; G01F 23/64; G01F 23/62; G01F 23/68; G01F 23/72;
(Continued)

(56) References Cited

U.S. PATENT DOCUMENTS 6,820,483 B1 11/2004 Beckerman
7,529,551 B2 5/2009 Tanaka et al.
(Continued)

FOREIGN PATENT DOCUMENTS

CN 205785124 U 12/2016
CN 108308979 * 7/2018
(Continued)

OTHER PUBLICATIONS

International Searching Authority, Written Opinion of the International Searching Authority, PCT/US2022/015873, Dated Jun. 9, 2022.

*Primary Examiner* — Robert R Raevis
(74) *Attorney, Agent, or Firm* — Reichel Stohry Dean LLP; Mark C. Reichel; Natalie J. Dean

(57) ABSTRACT

Disclosed herein are devices, systems, and methods for accurately determining fluid level using Ultra Wideband (UWB) positioning or localization. UWB utilizes a radio-frequency (RF) technology to enable the accurate measurement of the time-of-flight of a radio signal and UWB positioning can operate in Time-Difference-of-Arrival (TDoA) mode, Two-Way-Ranging (TWR) mode, and Phase-Difference-of-Arrival (PDoA) mode. The systems disclosed herein include multiple anchor devices having a UWB antenna(s) and positioned in fixed location(s) over the fluid to be measured. The anchor devices serve as reference points for UWB communication with a remote float device, which emits RF signals and floats on the surface of the fluid to be measured. The anchor devices may include, or be in communication with, a processor which receives and/or measures RF signals, generates timestamps, calculates distance (s) between the remote float device and an anchor device, calculates fluid level, calculates an angle-of-arrival (AoA), or any combination thereof.

19 Claims, 10 Drawing Sheets

Related U.S. Application Data continuation of application No. PCT/US2022/015873, filed on Feb. 9, 2022, which is a continuation-in-part of application No. 17/324,906, filed on May 19, 2021, now Pat. No. 11,248,946, said application No. 17/672,581 is a continuation-in-part of application No. 17/324,906, filed on May 19, 2021, now Pat. No. 11,248,946.

(60) Provisional application No. 63/147,346, filed on Feb. 9, 2021.

(58) Field of Classification Search
CPC ...... G01F 23/284; G01F 23/802; G01F 23/76; G01F 23/804; G05D 9/12
USPC ............ 73/290 R, 290 B, 290 V, 305–322.5; 340/618, 623–625; 342/124
See application file for complete search history.

(56) References Cited

U.S. PATENT DOCUMENTS

| | | |
|---|---|---|
| 11,150,321 B2 | 10/2021 | Lawitzky |
| 11,248,946 B1 * | 2/2022 | Kincaid .................. G01F 23/56 |
| 11,898,892 B2 * | 2/2024 | Kincaid ................ G01F 23/802 |
| 2004/0130442 A1 | 7/2004 | Breed et al. |
| 2006/0267756 A1 | 11/2006 | Kates |
| 2011/0101010 A1 | 5/2011 | Maiocco |
| 2020/0056919 A1 | 2/2020 | Jones |
| 2020/0065433 A1 | 2/2020 | Duff et al. |
| 2020/0180937 A1 | 6/2020 | Frith et al. |

FOREIGN PATENT DOCUMENTS

| | | | |
|---|---|---|---|
| CN | 208350178 U | | 1/2019 |
| DE | 102012002115 | * | 8/2013 |
| FR | 2391456 A1 | | 12/1978 |
| WO | 2016/145027 | * | 9/2016 |

* cited by examiner

Time-Difference-of-Arrival (TDoA)

Two-Way Ranging (TWR)

Two Way Ranging plus Phase-Difference-of-Arrival (TWR + PDoA)

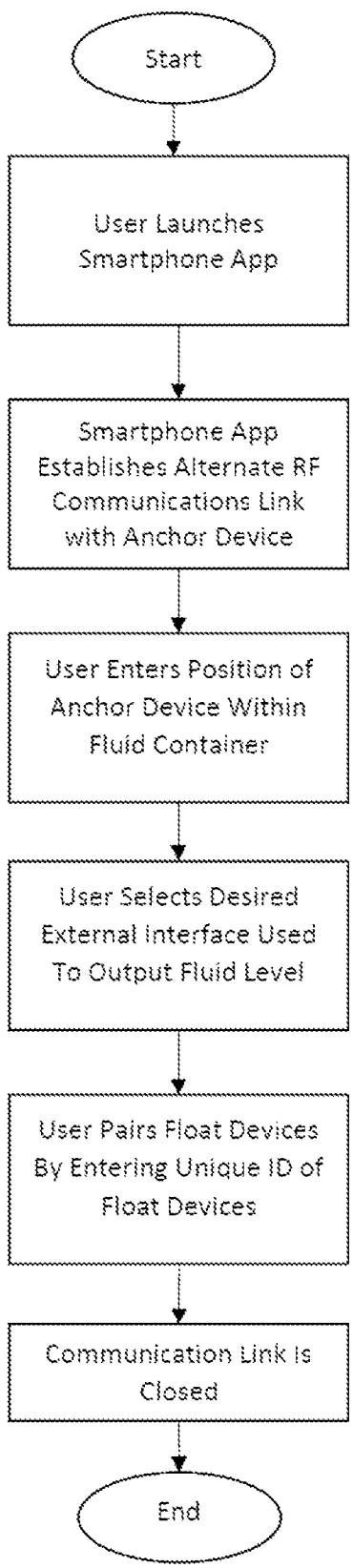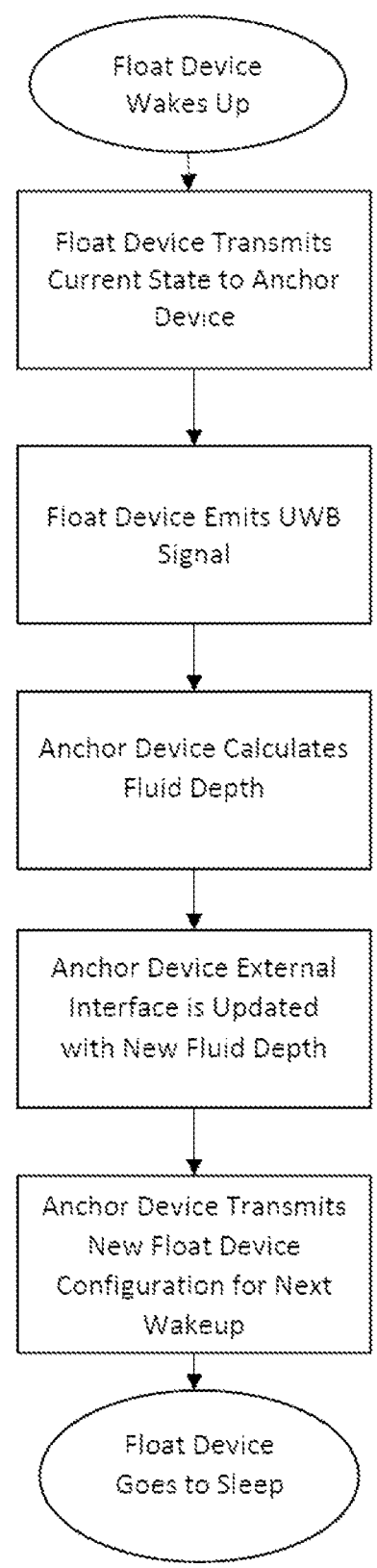
FIG. 11
FIG. 12

DEVICES, SYSTEMS, AND METHODS FOR MEASURING FLUID LEVEL USING RADIO-FREQUENCY (RF) LOCALIZATION

RELATED APPLICATIONS

The present application is related to, claims the priority benefit of, and is a U.S. continuation patent application of, U.S. Nonprovisional patent application Ser. No. 17/672,581, filed Feb. 15, 2022 and issued as U.S. Pat. No. 11,898,892 on Feb. 13, 2024, which a) is related to, claims the priority benefit of, and is a U.S. bypass continuation of, PCT Patent Application Serial No. PCT/US2022/015873, filed Feb. 9, 2022, which is related to, and claims the priority benefit of, 1) U.S. Nonprovisional patent application Ser. No. 17/324,906, filed May 19, 2021 and issued as U.S. Pat. No. 11,248,946 on Feb. 15, 2022, which is related to, and claims the priority benefit of, U.S. Provisional Patent Application Ser. No. 63/147,346, filed Feb. 9, 2021, and 2) U.S. Provisional Patent Application Ser. No. 63/147,346, filed Feb. 9, 2021, and b) is related to, claims the priority benefit of, and is a U.S. continuation-in-part patent application of, U.S. Nonprovisional patent application Ser. No. 17/324,906, filed May 19, 2021 and issued as U.S. Pat. No. 11,248,946 on Feb. 15, 2022, which is related to, and claims the priority benefit of, U.S. Provisional Patent Application Ser. No. 63/147,346, filed Feb. 9, 2021. The contents of each of the foregoing patents and patent applications are incorporated herein directly and by reference in their entirety.

BACKGROUND OF THE INVENTION

Various approaches have been used to measure the level of fluid contained in a container, such as within a wastewater wet well, sump pit, or other contained space. For example, in one approach, a float, such as an air-tight buoyant container, is suspended in a fluid and attached to a rod. The rod is attached at a swivel point that allows the float to move up and down as it floats on the surface of the fluid. The swivel point is also connected to a device, such as a variable resistor, that allows the position of the swivel point to be measured. A change in the swivel point's measured position then corresponds to a change in fluid level, which allows the fluid's depth to be known. However, this approach to measuring fluid level by using a float has several drawbacks, including having numerous moving parts prone to failure, a small-range depth measuring capability, and other limitations.

Other approaches are presently available for fluid level measurement. Ultrasonic fluid measuring involves injecting an ultrasonic wave towards the fluid's surface. A transducer then captures the ultrasonic wave reflected back by the fluid's surface and measures time-of-flight to calculate the fluid's depth. However, an ultrasonic fluid measuring system can be affected by changes in environmental conditions such as temperature and the presence of dust or vapor, resulting in inaccurate fluid level measurements.

Radar fluid measuring is another method which operates similarly to the ultrasonic measuring method by injecting a radio-frequency (RF) microwave toward the fluid's surface. A transducer then captures the RF microwave reflected by the fluid's surface and measures time-of-flight to calculate the fluid's depth. However, radar fluid measuring also suffers from inaccuracies caused by RF reflections off objects in the environment, which are often difficult to distinguish from the desired signal.

In another approach, a submersible pressure transducer configured to measure hydrostatic pressure may be submerged directly in the fluid to be measured. The height of the fluid column above the transducer is then calculated, which indicates the fluid's depth. However, these pressure transducers often suffer from clogs in the sensor element orifice and external vent tube, which require frequent servicing to correct. In yet another approach, determining the position of one device relative to another, known as positioning, is achievable by measuring the time-of-flight of RF signals between the devices. Since the speed of RF waves is constant (the speed of light), and the RF wave's travel time is measurable, calculating distances can be more accurately achieved.

Ultra Wideband (UWB) is an RF technology based on the IEEE 802.15.4a and 802.15.4z standards that can enable the very accurate measure of a RF signal's time-of-flight, leading to real time, centimeter-level accuracy distance measuring and/or positioning between UWB transceivers. According to the FCC, UWB is any signal that occupies a wide bandwidth (greater than 20% of the center frequency or 500 MHz) and utilizes the spectrum between 3.1 and 10.6 GHz. Additionally, UWB uses short pulses on the order of 10-1000 picoseconds. In theory, the time-of-flight of any RF signal can be measured. However, in practice, a wide-band RF signal provides a more accurate time measurement than narrowband signals such as Bluetooth, Bluetooth Low Energy (BLE) and/or Wi-Fi. It would thus be desirable to utilize the approach of positioning or localizing one device relative to another, combined with the centimeter-level accuracy of RF, or UWB technology, to provide an improved system and method for more accurately measuring the level of a fluid.

SUMMARY OF THE INVENTION

The present disclosure includes disclosure of a system for measuring a fluid level, comprising: at least one anchor device having a radio-frequency (RF) antenna positioned at a fixed location over a surface of a fluid; at least one remote float device configured to emit at least one RF signal and configured to float on the surface of a fluid to be measured; and a processor in operable communication with the at least one anchor device, the processor configured to: receive the at least one RF signal emitted from the at least one remote float device; analyze the at least one RF signal received by the RF antenna; and calculate a location of the at least one remote float device based upon the analyzed at least one RF signal received by the RF antenna, wherein the location of the at least one remote float device corresponds to a level of the fluid.

The present disclosure also includes disclosure of a system, wherein the processor is further configured to calculate a level of the fluid, based upon the calculated location of the at least one remote float device. The present disclosure also includes disclosure of a system, wherein the processor is further configured to: measure a time-of-flight of the at least one RF signal between the at least one remote float device and the at least one anchor device; and calculate level of the fluid based on the fixed location of the at least one anchor device and the time-of-flight of the at least one RF signal. The present disclosure also includes disclosure of a system, wherein the processor is further configured to: calculate location of the at least one remote float device based on the time-of-flight of the at least one RF signal and the fixed location of the at least one anchor device.

The present disclosure also includes disclosure of a system, wherein the processor is further configured to: receive the at least one RF signal on a plurality of RF antennas; and measure a phase-difference-of-arrival of the at least one RF signal received from each of the plurality of RF antennas.

The present disclosure also includes disclosure of a system, wherein the processor is further configured to: calculate the location of the at least one remote float device in a plurality of dimensions based on the time of flight, the phase-difference-of-arrival, and the fixed location of the at least one anchor device. The present disclosure also includes disclosure of a system, wherein the processor is further configured to recognize a predetermined threshold condition; and emit a RF signal in response to meeting the predetermined threshold condition. The present disclosure also includes disclosure of a system, wherein meeting the predetermined threshold condition includes one selected from the group of: receipt of a message generated by either the at least one anchor device or by the at least one remote float device; movement of the at least one remote float device; receipt of auxiliary sensor input; diagnostic events; and passage of a predetermined time interval.

The present disclosure also includes disclosure of a system, wherein the processor is further configured to signal a pump control system to pump the fluid in response to the fluid level being greater than a threshold value.

The present disclosure also includes disclosure of a system, wherein the processor is further configured to receive location data identifying the fixed position of the at least one anchor device; receive a unique ID of the at least one remote float device; and store the location data and unique ID of the at least one remote float device. The present disclosure also includes disclosure of a system, further comprising at least three anchor devices, wherein the processor is further configured to: synchronize time on each of the at least three anchor devices; determine a time-of-flight of an RF signal sent between the at least one remote float device and each of the at least three anchor devices; measure a time difference-of-arrival (TDoA) based on times the RF signal is received by each of the at least three anchor devices; and calculate the time-of-flight based on the TDoA measurement.

The present disclosure also includes disclosure of a system, wherein the processor is positioned within one of the at least one anchor devices. The present disclosure also includes disclosure of a system, wherein the RF antenna comprises an UWB antenna. The present disclosure also includes disclosure of a system, wherein the processor is in a remote location and communicates with either the at least one remote float device, or the at least one anchor device, using alternate RF communication, such as, but not limited to, Wi-Fi, BLE, and/or sub-GHz. The present disclosure also includes disclosure of a system, further comprising a wired power connection, wherein the at least one anchor device and the at least one remote float device communicate using the wired power connection. The present disclosure also includes disclosure of a system, wherein the at least one remote float device further comprises at least one auxiliary sensor selected from the group consisting of: a microphone, a pressure transducer, and a camera.

The present disclosure includes disclosure of a system for measuring a fluid level using two-way RF communication modes, comprising: at least one anchor device having a radio-frequency (RF) antenna positioned at a fixed location over a surface of a fluid; at least one remote float device configured to emit one or more RF signals and configured to float on the surface of the fluid to be measured; and a processor in operable communication with the at least one anchor device, the processor configured to: receive at least one RF signal emitted from the at least one remote float device; analyze the at least one RF signal received by the RF antenna; and calculate a location of the at least one remote float device based upon a time-of-flight or an angle-of-arrival (AoA) of the analyzed at least one RF signal received by the RF antenna, wherein the location of the at least one remote float device corresponds to a level of the fluid. The present disclosure also includes disclosure of a system, wherein the processor is further configured to calculate an angle, in at least one plane, of the at least one remote float device relative to the at least one anchor device. The present disclosure also includes disclosure of a system, wherein the processor is further configured to calculate an angle, in at least one plane, of the at least one anchor device relative to the at least one remote float device.

The present disclosure also includes disclosure of a method, for measuring fluid level, comprising: positioning at least one anchor device at a fixed location over a surface of a fluid, the at least one anchor device operably coupled to at least one UWB antenna therein; floating at least one remote float device on the surface of the fluid, the at least one remote float device configured to emit RF signals; receiving at least one RF signal at a processor; generating one or more measurements, at the processor, in response to receipt of the at least one RF signal, the one or more measurements comprising a time-of-flight of the at least one RF signal between the at least one remote float device and the at least one anchor device, an angle of arrival, or a combination thereof; calculating, based upon the one or more measurements, at least one of: i) a level of the fluid; ii) a distance between the at least one remote float device and the at least one anchor device; and iii) an angle in at least one plane of the at least one remote float device relative to the at least one anchor device; and providing a measurement of fluid level based upon the calculating of the one or more measurements.

The present disclosure also includes disclosure of a method, wherein the time-is-flight is measured based on a time value encoded in the at least one RF signal, wherein the at least one RF signal is generated by the at least one remote float device, the at least one anchor device, or a combination thereof. The present disclosure also includes disclosure of a system for measuring a fluid level, comprising at least one anchor device having at least one radio-frequency (RF) antenna positioned at a fixed location over a surface of a fluid to be measured, at least one remote float device configured to emit at least one RF signal and configured to float on the surface of a fluid to be measured, and a processor in operable communication with the at least one anchor device, the processor configured to receive the at least one RF signal from the at least one RF antenna, emitted from the at least one remote float device, analyze the at least one RF signal from the at least one RF antenna, measure a time-of-flight of the at least one RF signal between the at least one remote float device and the at least one anchor device, calculate a location of the at least one remote float device based upon the analyzed at least one RF signal received by the at least one RF antenna, wherein the location of the at least one remote float device corresponds to a level of the fluid.

The present disclosure also includes disclosure of a system, wherein the processor is further configured to calculate a level of the fluid, based upon the calculated location of the at least one remote float device. The present disclosure also includes disclosure of a system, wherein the processor is further configured to calculate a level of the fluid based on the fixed location of the at least one anchor device and the time-of-flight of the at least one RF signal. The present disclosure also includes disclosure of a system, wherein the processor is further configured to calculate location of the at least one remote float device based on the time-of flight of the at least one RF signal and the fixed location of the at least one anchor device. The present disclosure also includes disclosure of a system, wherein the processor is further configured to receive the at least one RF signal on a plurality of RF antennas, and measure a phase-difference-of-arrival of the at least one RF signal received from each of the plurality of RF antennas. The present disclosure also includes disclosure of a system, wherein the processor is further configured to calculate the position of the at least one remote float device in a plurality of dimensions based on the time-of-flight and the phase-difference-of-arrival.

The present disclosure also includes disclosure of a system, wherein the processor is further configured to recognize a predetermined threshold condition, and emit a RF signal in response to meeting the predetermined threshold condition. The present disclosure also includes disclosure of a system, wherein meeting the predetermined threshold condition includes one selected from the group of receipt of a message generated by either the at least one anchor device or by the at least one remote float device, movement of the at least one remote float device, receipt of auxiliary sensor input, diagnostic events, and passage of a predetermined time interval. The present disclosure also includes disclosure of a system, wherein the processor is further configured to signal a control system in response to the fluid level being greater than or less than a threshold value. The present disclosure also includes disclosure of a system, wherein the processor is further configured to receive location data identifying the fixed position of the at least one anchor device, receive a unique ID of the at least one remote float device, and store the location data and unique ID of the at least one remote float device. The present disclosure also includes disclosure of a system, further comprising at least three anchor devices, wherein the processor is further configured to synchronize time on each of the at least three anchor devices, and measure a time difference-of-arrival (TDoA) based on times the at least one RF signal is received by each of the at least three anchor devices. The present disclosure also includes disclosure of a system, wherein the processor is positioned within one of the at least one anchor devices. The present disclosure also includes disclosure of a system, wherein the at least one RF antenna comprises an UWB antenna. The present disclosure also includes disclosure of a system, wherein the processor is in a remote location and communicates with either the at least one remote float device, or the at least one anchor device, using alternate RF communications consisting of Wi-Fi, BLE, and/or sub-GHz. The present disclosure also includes disclosure of a system, wherein the at least one remote float device further comprises at least one auxiliary sensor selected from the group consisting of a microphone, a pressure transducer, and a camera.

The present disclosure also includes disclosure of a system for measuring a fluid level using two-way RF communication modes, comprising at least one anchor device having at least one radio-frequency (RF) antenna positioned at a fixed location over a surface of a fluid to be measured, at least one remote float device configured to emit one or more RF signals and configured to float on the surface of the fluid to be measured, and a processor in operable communication with the at least one anchor device, the processor configured to receive at least one RF signal from the at least one RF antenna, emitted from the at least one remote float device, analyze the at least one RF signal from the at least one RF antenna, and calculate a location of the at least one remote float device based upon a time-of-flight and/or a phase-difference-of-arrival (PDoA) of the analyzed at least one RF signal received by the at least one RF antenna, wherein the location of the at least one remote float device corresponds to a level of the fluid. The present disclosure also includes disclosure of a system, wherein the processor is further configured to calculate an angle, in at least one plane, of the at least one remote float device relative to the at least one anchor device. The present disclosure also includes disclosure of a system, wherein the processor is further configured to calculate an angle, in at least one plane, of the at least one anchor device relative to the at least one remote float device.

The present disclosure also includes disclosure of a system for measuring a fluid level, comprising at least one anchor device having a first radio-frequency (RF) transceiver positioned at a fixed location over a surface of a fluid to be measured, at least one remote float device having a second radio-frequency (RF) transceiver configured to float on the surface of the fluid to be measured, a transceiver coupled to the RF antenna, configured to receive the at least one RF signal from the at least one RF antenna, a transceiver coupled to the at least one RF antenna configured to extract packets from the at least one RF signal, a processor in operable communication with at least one of the first RF transceiver and the second RF transceiver, the processor configured to receive the at least one packet from the second RF transceiver, transmitted from the at least one remote float device, analyze the at least one packet from the second RF transceiver, measure a time-of-flight of the at least one RF signal between the at least one remote float device and the at least one anchor device using the RF packets, calculate a location of the at least one remote float device based upon the time-of-flight, wherein the location of the at least one remote float device corresponds to a level of the fluid.

The present disclosure also includes disclosure of a system, wherein the at least one remote float device further comprises a chemical-resistant coating to prevent corrosion and adhesion of foreign material to the remote float device. The present disclosure also includes disclosure of a system, wherein the chemical-resistant coating is configured to prevent the adhesion of grease to the remote float device. The present disclosure also includes disclosure of a system, wherein the at least one remote float device further comprises a mechanical housing selected from the group consisting of an air-tight housing, a capture ring, a stabilizing fin, and a counter-weight. The present disclosure also includes disclosure of a system, wherein the processor is further configured to adjust an interval at which the RF signals are emitted by the at least one remote float device based on a rate of change of the level of the fluid. The present disclosure also includes disclosure of a system, wherein the at least one remote float device or the at least one anchor device is configured to optimize RF transmitting power to reduce reflections and extend battery life. The present disclosure also includes disclosure of a system, wherein the processor is further configured to signal a pump control system to pump the fluid in response to remaining space in the container being greater than or less than a threshold value. The present disclosure also includes disclosure of a system, wherein the processor is further configured to notify an external control system that the level of the fluid has changed.

The present disclosure also includes disclosure of a system, wherein the processor is further configured to notify an external control system in response to receipt of a message from the at least one anchor device or the at least one remote float device. The present disclosure also includes disclosure of a system, wherein the processor is also in operable communication with the at least one anchor device or the at least one remote float device using an alternate RF communications comprising Wi-Fi, BLE, or sub-GHz antenna. The present disclosure also includes disclosure of a system, wherein the at least one remote float device is further configured to detecting activity of pumps of the pump control system by analyzing acoustic characteristics from a microphone positioned relative to the pumps, and transmitting data from the microphone to the processor. The present disclosure also includes disclosure of a system, wherein the at least one remote float device is further configured to operate a pressure transducer to detect a condition of the at least one remote float device as being submerged under the surface of the fluid. The present disclosure also includes disclosure of a system, wherein the at least one remote float device further comprises at least one auxiliary sensor selected from the group consisting of an accelerometer, a gyroscope, and a magnetometer. The present disclosure also includes disclosure of a system, wherein the at least one remote float device further comprises an accelerometer, the at least one remote float device further configured to operate the accelerometer to detect a condition of the at least one remote float device as not being level with the surface of the fluid. The present disclosure also includes disclosure of a system, wherein the processor is further configured to obtain telemetry data and instruct said telemetry data to be stored within an external data storage system. The present disclosure also includes disclosure of a system, wherein the telemetry data is selected from the group consisting of fluid level, fluid overflow, fluid temperatures, stored power levels, and microphone data.

The present disclosure also includes disclosure of a method of operating a system for measuring a fluid level, the method comprising the steps of floating at least one remote float device on a surface of a fluid to be measured, the at least one remote float device comprising at least one radio-frequency transceiver configured to transmit and receive radio-frequency (RF) signals, positioning at least one anchor device at a fixed location over the surface of the fluid to be measured, the at least one anchor device comprising at least one radio-frequency transceiver configured to transmit and receive RF signals, capturing transmission and reception timestamps of the RF signals transmitted between the at least one anchor device and the at least one remote float device, exchanging the transmission and reception timestamps between the at least one anchor device and the at least one remote float device in a two-way ranging round to calculate a time-of-flight of the RF signals, and calculating a distance between each at least one anchor device and the at least one remote float device based upon the time-of-flight of the RF signals. The present disclosure also includes disclosure of a method, further comprising the step of calculating a level of the fluid based upon the fixed location of each at least one anchor device and the calculated distance between each at least one anchor device and the at least one remote float device. The present disclosure also includes disclosure of a method, further comprising measuring at least one phase-difference-of-arrival (PDoA) of the RF signals as the RF signals are received by a plurality of antennas within each at least one anchor device, calculating at least one angle of arrival (AoA), in at least one plane, of each at least one remote float device relative to each at least one anchor device based upon the PDoA measurements, and calculating a position of each at least one remote float device relative to each at least one anchor device using the calculated distance and the calculated at least one angle of arrival, where the positions correspond to the surface of the fluid. The present disclosure also includes disclosure of a method, further comprising calculating a level of the fluid based upon the fixed location of each at least one anchor device and the calculated positions of each at least one remote float device relative to each at least one anchor device.

The present disclosure also includes disclosure of a method for measuring fluid level, comprising positioning at least one anchor device at a fixed location over a surface of a fluid to be measured, the at least one anchor device operably coupled to at least one UWB antenna therein, floating at least one remote float device on the surface of the fluid to be measured, the at least one remote float device configured to emit RF signals, receiving at least one RF signal from the RF antenna at a processor, generating one or more measurements, at the processor, in response to receipt of the at least one RF signal, the one or more measurements comprising a time-of-flight of the at least one RF signal between the at least one remote float device and the at least one anchor device, an angle of arrival, or a combination thereof, calculating, based upon the one or more measurements, at least one of: i) a level of the fluid; and ii) a distance between the at least one remote float device and the at least one anchor device; and iii) an angle in at least one plane of the at least one remote float device relative to the at least one anchor device, and providing a measurement of fluid level based upon the calculating of the one or more measurements. The present disclosure also includes disclosure of a method, wherein the time-is-flight is measured based on a time value encoded in the at least one RF signal from the RF antenna, wherein the at least one RF signal is generated by the at least one remote float device, the at least one anchor device, or a combination thereof.

The present disclosure also includes disclosure of a method of operating fluid level measurement system configured to measure a distance between at least one anchor device and at least one remote float device, the method comprising the steps of floating the at least one remote float device on a surface of a fluid to be measured, positioning the at least one anchor device at a fixed location over the surface of the fluid to be measured, transmitting packets from the at least one remote float device to the at least one anchor device, transmitting the packets from the at least one anchor device back to the at least one remote float device after a specified length of time, calculating the time required for the packets to be transmitted to the at least one anchor device and back to the at least one remote float device using two-way ranging, and calculating a distance to the least one remote float device based upon the two-way ranging, wherein the distance of the at least one remote float device corresponds to a level of the fluid.

BRIEF DESCRIPTION OF THE DRAWINGS

The disclosed embodiments and other features, advantages, and disclosures contained herein, and the matter of attaining them, will become apparent and the present disclosure will be better understood by reference to the following description of various exemplary embodiments of the present disclosure taken in conjunction with the accompanying drawings, wherein:

FIG. 11 illustrates an exemplary logic flow diagram for a smartphone application that may communicate with a system for measuring fluid level using UWB positioning; and FIG. 12 illustrates an exemplary logic flow diagram of communications between an anchor device and a remote float device.

Figure 1A:
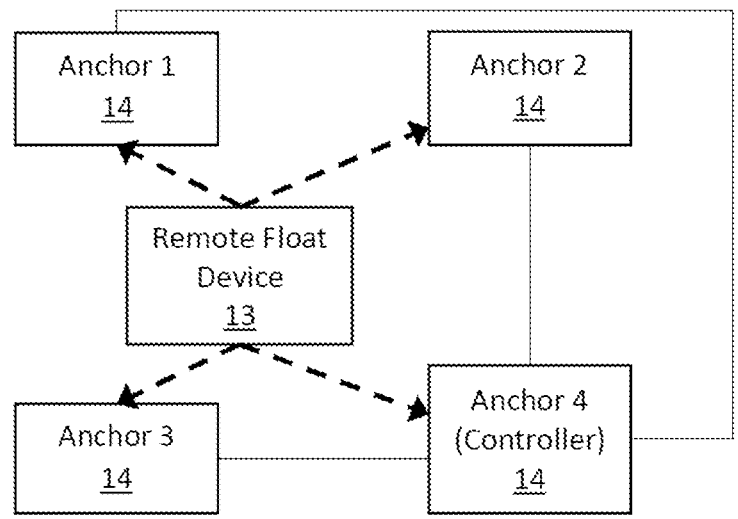
FIG. 1A illustrates a block diagram of an exemplary system for measuring fluid level using UWB positioning in Time-Difference-of-Arrival (TDoA) mode.

As such, an overview of the features, functions and/or configurations of the components depicted in the various figures will now be presented. It should be appreciated that not all of the features of the components of the figures are necessarily described and some of these non-discussed features (as well as discussed features) are inherent from the figures themselves. Other non-discussed features may be inherent in component geometry and/or configuration. Furthermore, wherever feasible and convenient, like reference numerals are used in the figures and the description to refer to the same or like parts or steps. The figures are in a simplified form and not to precise scale.

DETAILED DESCRIPTION

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

The present disclosure includes various devices, systems, and methods for determining fluid level using radio-frequency (RF) positioning. In some embodiments, Ultra Wideband (UWB) localization may be used, noting that any RF technology or signal (not just UWB), including those which may be developed in the future, may also be used. UWB is a RF technology which enables the accurate measurement of the time-of-flight of a radio signal, thus providing centimeter-level accuracy and providing accurate fluid level measurements. The radio signals may contain messages, also known packets. The methods disclosed herein may be used to accurately measure fluid level in a container, or in another other body of water. The term 'container' may describe anything that holds fluids, such as, but not limited to, vessels, tanks, pits, and bodies of water such as oceans, seas, lakes, rivers, and canals, etc. These methods also involve communications between one-to-one devices or one-to-many devices to more accurately determine positioning and/or localization. UWB positioning or localization can operate in various modes, such as, but not limited to Time-Difference-of-Arrival (TDoA), Two-Way Ranging (TWR), and Phase-Difference-of-Arrival (PDoA), as will be described in further detail below. These modes may also be applicable to RF positioning or localization in combination with other technologies such as, but not limited to, Wi-Fi and/or BLE.

In one embodiment, an exemplary system for determining fluid level using UWB positioning in TDoA mode is shown generally in FIG. 1A. In this TDoA mode embodiment, multiple anchor devices 14 (also called "anchors" herein) may be positioned in multiple known locations to serve as reference points for UWB communication with a remote float device 13. The anchor devices 14 may be time-synchronized to provide a clock base for time measurements. The remote float device 13 emits an UWB signal, and each anchor device 14 then timestamps the signal as it is received. The timestamps from each anchor device 14 in the system are sent to a processor, such as within a controller, where the TDoA signals between the anchors 14 are used in an algorithm which computes the remote float device's 13 position in multiple dimensions. The processor and/or controller may be one of the system's own anchor devices 14, and/or it may be separate from the anchor devices 14, while still being in operable communication with the anchor devices 14.

Figure 1B:
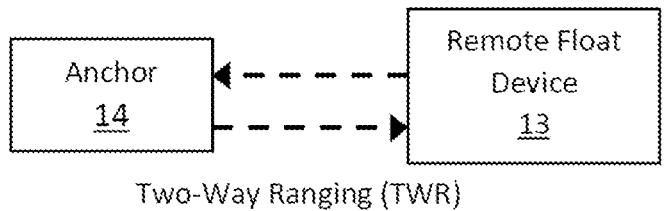
FIG. 1B illustrates a schematic of an exemplary system for measuring fluid level using UWB positioning in Two-Way-Ranging (TWR) mode.

In another embodiment, an exemplary system for determining fluid level using UWB positioning in TWR mode is shown in FIG. 1B. In this TWR mode embodiment, an anchor device 14 and a remote float device 13 utilize two-way UWB communications. This TWR mode measures the time-of-flight of at least two messages exchanged between a remote float device 13 and an anchor device 14. The remote float device 13 may initiate an UWB signal exchange by emitting a first message. In this case, time synchronization between the anchor 14 and remote float device 13 is unnecessary because the timestamps of message transmission and reception are encoded in the messages as they are exchanged. The anchor device 14 uses the encoded timestamps to calculate round-trip time to the remote float device 13, which is used to derive the distance between itself and the remote float device 13. In an alternative configuration, the anchor device 14 can initiate an exchange by emitting the first message, which then allows the remote float device 13 to calculate the distance between itself and the anchor device 14. In another embodiment, multiple anchor devices 14 may be used with one or more remote float device(s) 13 in a TWR system to provide information on a remote float device's 13 positioning in multiple dimensions.

Figure 1C:
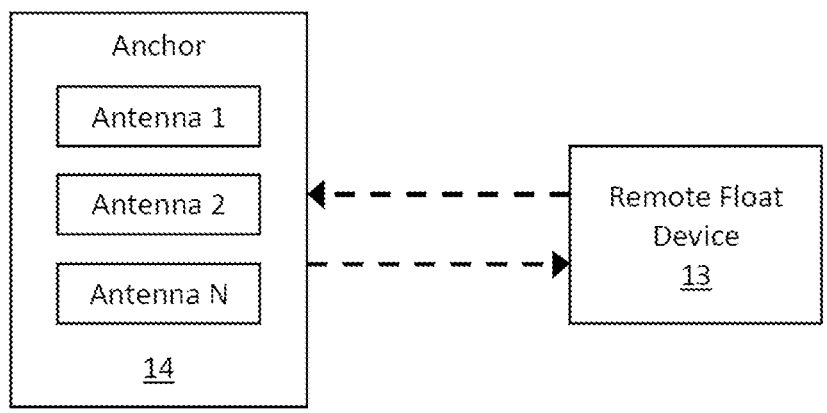
FIG. 1C illustrates a schematic of an exemplary system for measuring fluid level using UWB positioning in Two Way Ranging plus Phase-Difference-of-Arrival (TWR+PDoA) mode.

In another embodiment, an exemplary system for determining fluid level using UWB positioning in TWR+PDoA mode is shown in FIG. 1C. In this TWR+PDoA mode embodiment, the distance between an anchor device 14 having multiple antennas, and a remote float device 13, may be determined using TWR. This system may provide a measure of the angle (or angle-of-arrival (AoA)) between peer devices, in addition to a measure of the distance between remote float devices 13. The AoA is derived by measuring the PDoA of the RF signal as received by a plurality of antennas. The RF signal will reach each antenna at a slightly different time, resulting in a measurable phase difference. The phase difference is used to derive the AoA, or bearing, of the RF signal. If at least three antennas are used in a PDoA architecture, a remote float device's 13 positioning can be determined in three dimensions.

Figure 2:
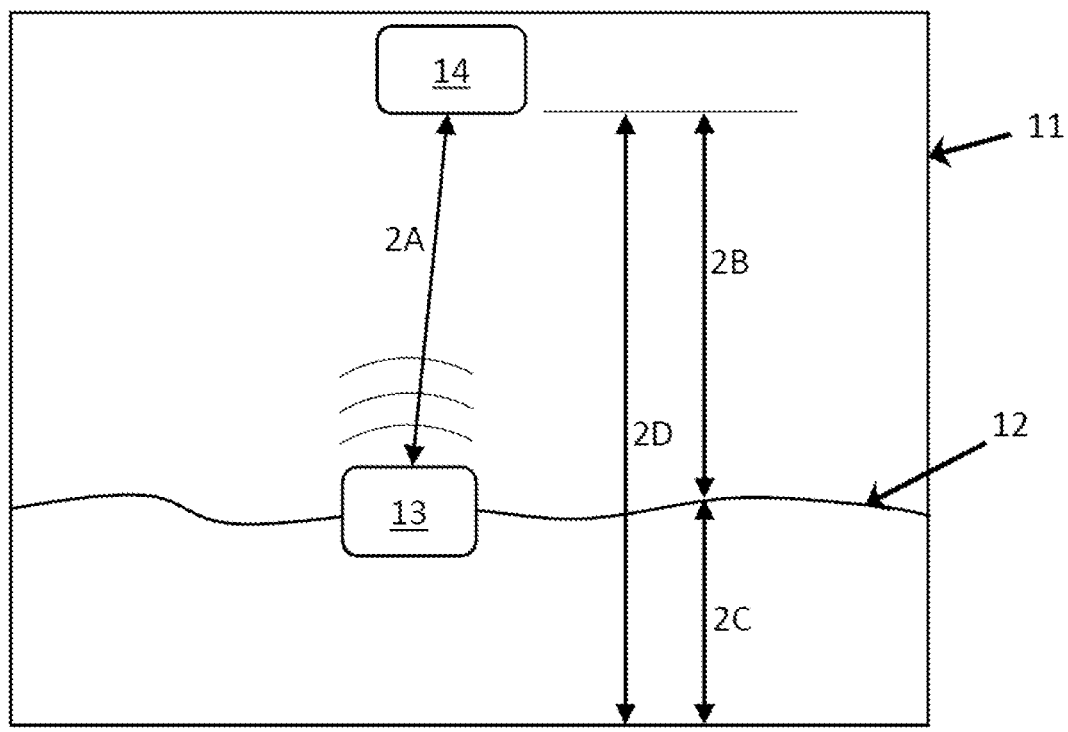
FIG. 2 illustrates a diagram of an exemplary system for measuring fluid level using UWB positioning in TWR mode.

FIG. 2 illustrates an exemplary embodiment of a system for determining fluid level in a container 11 using UWB positioning in TWR mode. The system may include a remote float device 13 in UWB communication with an anchor device 14. The anchor device 14 may have a UWB antenna and be mounted in a fixed location above the fluid level 12 in a container 11. The remote float device 13 emits a UWB signal and floats on the surface of the fluid 12, as shown in FIG. 1. The distance between the anchor device 14 and the remote float device 13 can be calculated using UWB positioning or localization techniques. This distance, and the anchor device's 14 known height above the bottom of the container, may then be used to calculate the level of fluid 12. The anchor device 14 uses its UWB antenna, or UWB antenna array, to receive the RF signal and it may then operate as a processor to calculate the distance (shown in dimension 2A) between itself and the remote float device 13 using TWR. In this embodiment, distance dimension 2A also approximates the distance dimension 2B, as shown in FIG. 2. With the anchor device's 14 known height above the bottom of the container 11 (shown as dimension 2D), the level of the fluid 12 (shown as dimension 2C) may then be calculated by subtracting dimension 2B from 2D. Resulting dimension 2C then provides an accurate measurement of the level of the fluid 12 in container 11. In some embodiments, the level of the fluid 12 may also be used to determine the depth of the fluid 2C.

Figure 3:
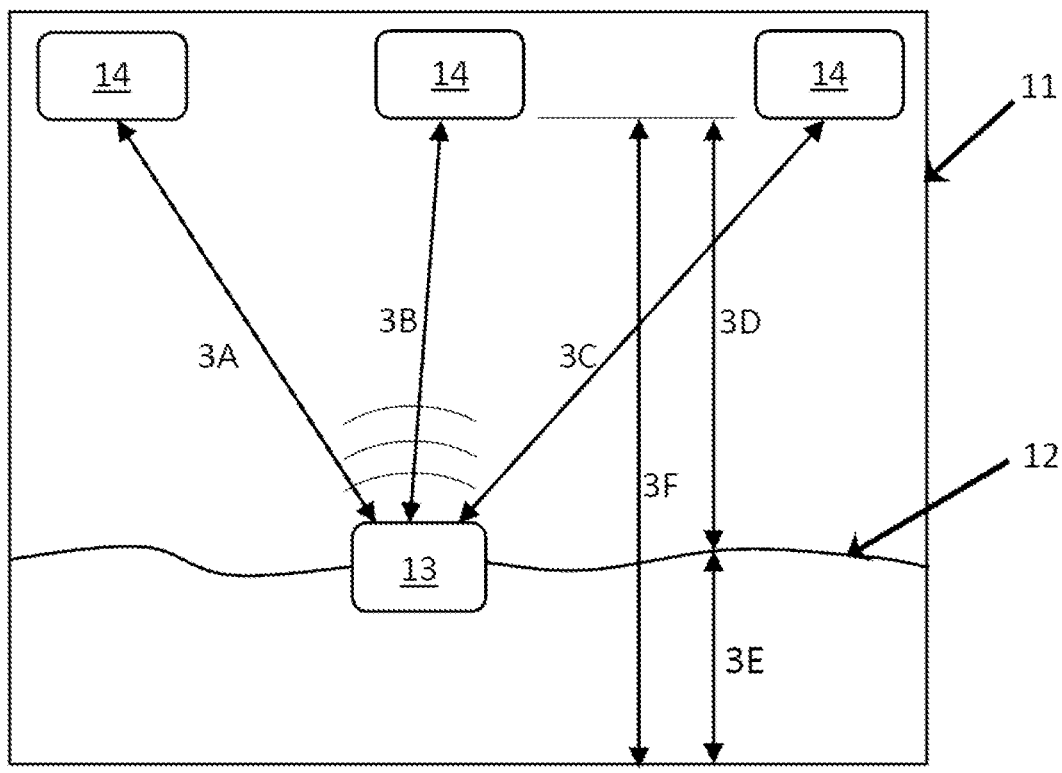
FIG. 3 illustrates a diagram of an exemplary system for measuring fluid level using UWB positioning in TDoA mode.

FIG. 3 illustrates an exemplary embodiment of a system for determining fluid level in a container 11 using UWB positioning in TDoA mode. The system may include multiple UWB anchor devices 14, each with its own corresponding UWB antenna. The anchor devices 14 may be mounted in fixed locations above the fluid level 12 in a container 11. One or more remote float device(s) 13 may be floating on the surface of the fluid 12. The use of more than one remote float device 13 adds redundancy to the system. The system may operate in TDoA mode in communication with a processor and/or controller. In some embodiments, at least one of the anchor devices 14 may operate as a processor and/or controller and/or may be in operable communication with a processor and/or controller. The processor and/or controller may calculate the position of the remote float device 13 relative to the anchor devices 14 by determining distances 3A, 3B, and 3C, using TDoA, from which dimension 3D may be derived, as shown in FIG. 3. The known distances may also be used in a calculation to determine the position of each remote float device 13 in multiple dimensions. The calculated position of the remote float device(s) 13, and each anchor device's 14 known position relative to the bottom of the container 11, is used to calculate the level of the fluid 12. With each anchor devices' 14 known height above the bottom of the container 11 (shown as dimension 3F), the level of the fluid 12 (shown as dimension 3E) is calculated by subtracting dimension 3D from 3F. Resulting dimension 3E then provides an accurate measurement of the level of the fluid 12 in container 11.

Figure 4:
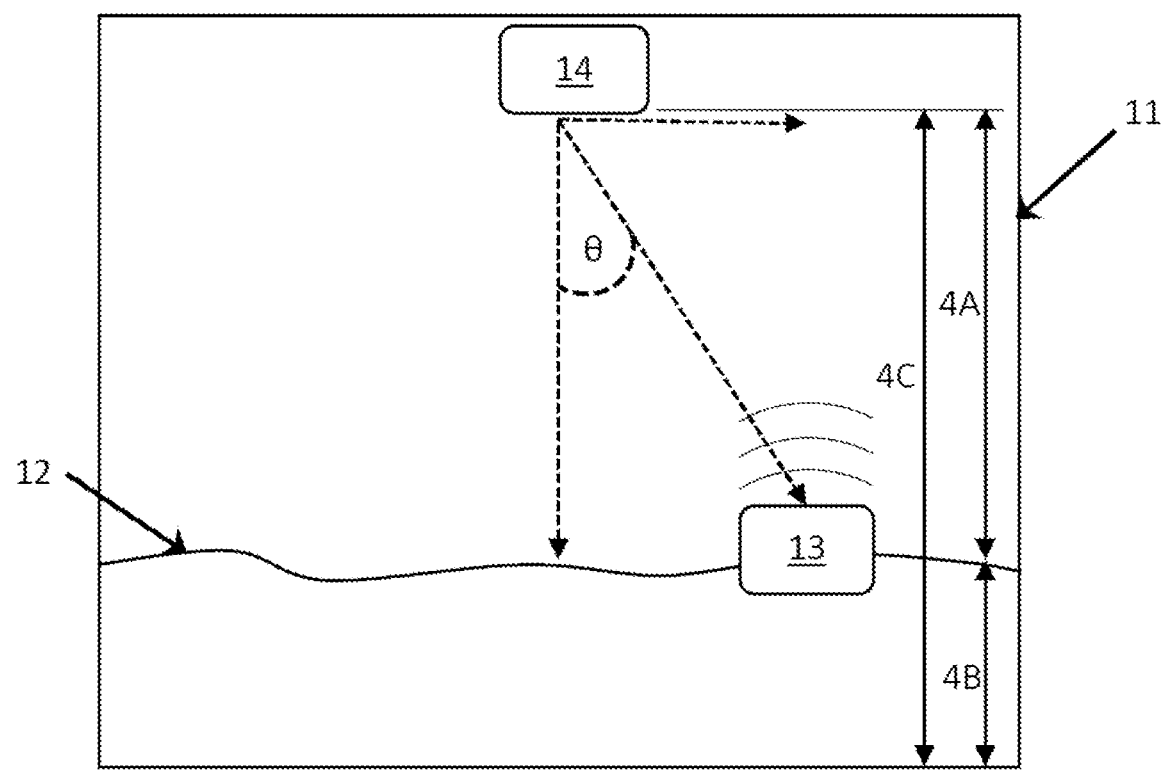
FIG. 4 illustrates a diagram of an exemplary system for measuring fluid level using UWB positioning in TWR+PDoA mode.

FIG. 4 illustrates an exemplary embodiment of a system for determining fluid level in a container 11 using UWB positioning in TWR+PDoA mode. The system may include at least one UWB anchor device 14 having a plurality of UWB antennas, or a UWB antenna array. The anchor device 14 may be mounted in a fixed location above the fluid level 12 in a container 11. One or more remote float device(s) 13 may be floating on the surface of the fluid 12. The plurality of UWB antennas in the at least one anchor device 14 may provide information on the positioning of the remote float device(s) 13 in multiple dimensions. The anchor device 14 may calculate the position of the remote float device(s) 13 relative to the anchor 14 using TWR+PDoA mode. The PDoA of the RF signal is measured as received by a plurality of antennas. The position of the antennas relative to each other within the anchor device 14 is critical to ensure accurate measurement of PDoA. The separation distance of the antennas must be chosen based on the wavelength of the RF signal. To determine position in three dimensions, at least three antennas are required, and at least one antenna is positioned in a separate plane or offset in at least one axis in the same plane. The PDoA may be measured with a plurality of antenna pairs, to derive an AoA. The AoA for one of the planes is illustrated as theta ($\theta$) in this example. The AoA for all planes and the measured distance provides a 3D vector (or coordinate) that allows for the calculation of dimension 4A, as shown in FIG. 4. With the anchor device's 14 known height above the bottom of the container 11 (shown as dimension 4C), the level of the fluid 12 (shown as dimension 4B) is calculated by subtracting dimension 4A from 4C. Resulting dimension 4B then provides an accurate measurement of the level of the fluid 12 in container 11.

In any of the examples described herein, it should be appreciated that the anchor device(s) 14 and/or remote float device(s) 13 may each comprise its own processor and/or controller and/or may share processing responsibility for calculating, analyzing, and/or determining the fluid level 12. In some examples, one or more of the anchor device(s) 14 may initiate contact with the remote float device(s) 13. Alternatively, or in addition, the remote float device(s) 13 may initiate contact with the anchor device(s) 14. After contact is initiated, the time of flight and/or angle may be calculated by the remote float device(s) 13, anchor device(s) 14, processors, and/or any combination thereof. For example, the anchor device(s) 14 may calculate the angle of a remote float device 13 relative to itself. Likewise, the remote float device 13 may calculate the angle of an anchor device relative to itself. Furthermore, the fluid level 11 may be calculated by the anchor device(s) 14, remote float device(s) 13, processors, and/or any combination thereof. Finally, the calculated fluid level may be output by the remote float device(s) 13, anchor device(s) 14, processors, and/or any combination thereof.

Figure 5A:
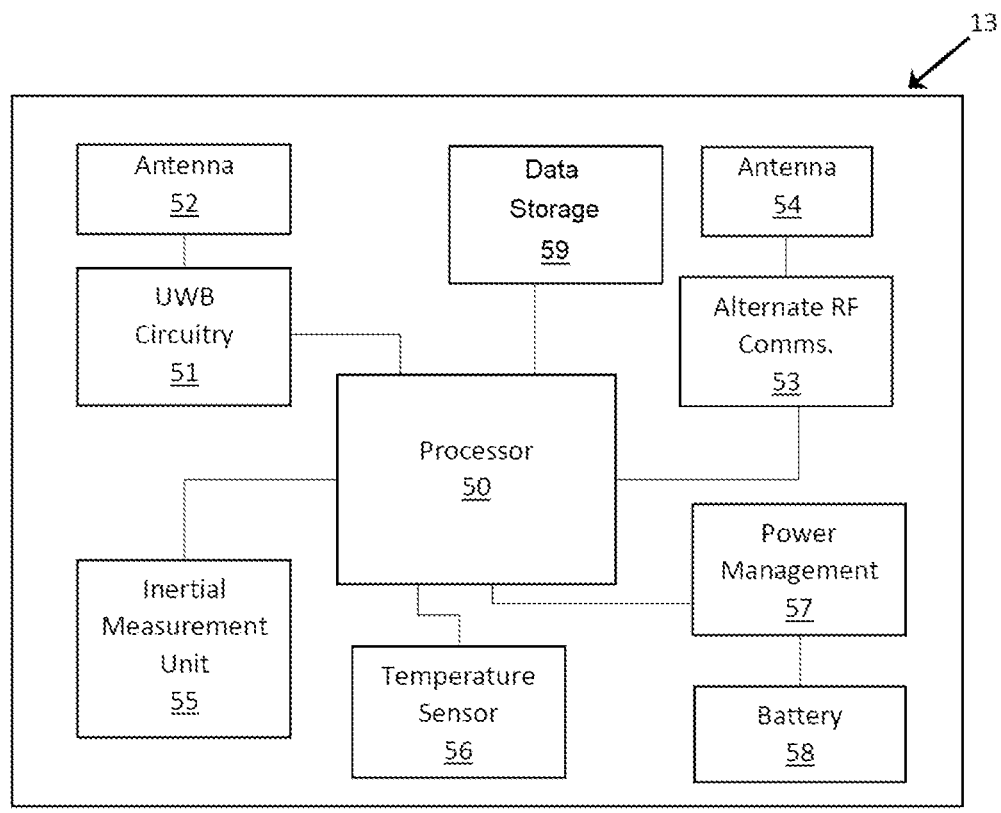
FIG. 5A illustrates a block diagram of an exemplary remote float device.

FIG. 5A illustrates an exemplary UWB positioning remote float device 13 powered by a battery 58. The remote float device 13 may include, at least, a processor 50 operably coupled to: UWB circuitry 51 connected to an UWB antenna 52; alternative RF communications 53 connected to an antenna 54; an inertial measurement unit (IMU) 55; a temperature sensor 56; and power management 57 connected to battery 58. The processor 50 may be suitable for executing algorithms and/or processing data in accordance with operating logic. The UWB circuitry 51 may contain RF components, ICs, and passive components, or a module to implement an UWB transmitter and/or transceiver. The alternate RF communications 53 may also include RF components, ICs, and passive components, and/or a module to implement an alternate RF communications transceiver, such as, but not limited to, a Wi-Fi, BLE, and/or sub-GHz transceiver. The alternate RF communication's 53 transceiver may also be used as an additional RF communication link to an anchor device 14 and/or to third-party devices, such as a smartphones, etc. The IMU 55 may be used to measure and report a body's specific force, angular rate, and/or orientation using a combination of accelerometers, gyroscopes, and sometimes magnetometers. For example, the IMU 55, or other auxiliary sensor inputs (microphones, pressure sensors, cameras, etc.), may be used to determine fault conditions, such as a condition where the remote float device 13 is not level with the surface of the fluid 12, which may indicate it is stuck. The temperature sensor 56 may be used to compensate for the effects of temperature on individual components in the system or in calculations performed in the processor 50. The power management 57 ensures the other components within the remote float device 13 receive adequate power, and also monitors the health and remaining capacity of the battery 58.

In addition to the IMU 55, auxiliary sensors may also be utilized in the remote float device 14 to provide additional trigger criteria and inputs to the processor and/or controller. Additional auxiliary sensors may include, but are not limited to, audible sensors such as microphones, pressure sensors such as pressure transducers, and/or optical sensors such as cameras. In one example, a microphone may be used to detect fault conditions for pumps 74, 75, & 84 (described below with regard to FIGS. 7 & 8), as the acoustic characteristics of pumps change as they begin to fail or are unable to operate as designed. In another example, a pressure transducer may be used to detect if the remote float device 13 becomes submerged in fluid 12, such as because something is preventing it from floating. In another example, a camera may be used for validation of system status and/or fault conditions that are detected by the remote float device 13 and/or anchor device 14.

Figure 5B:
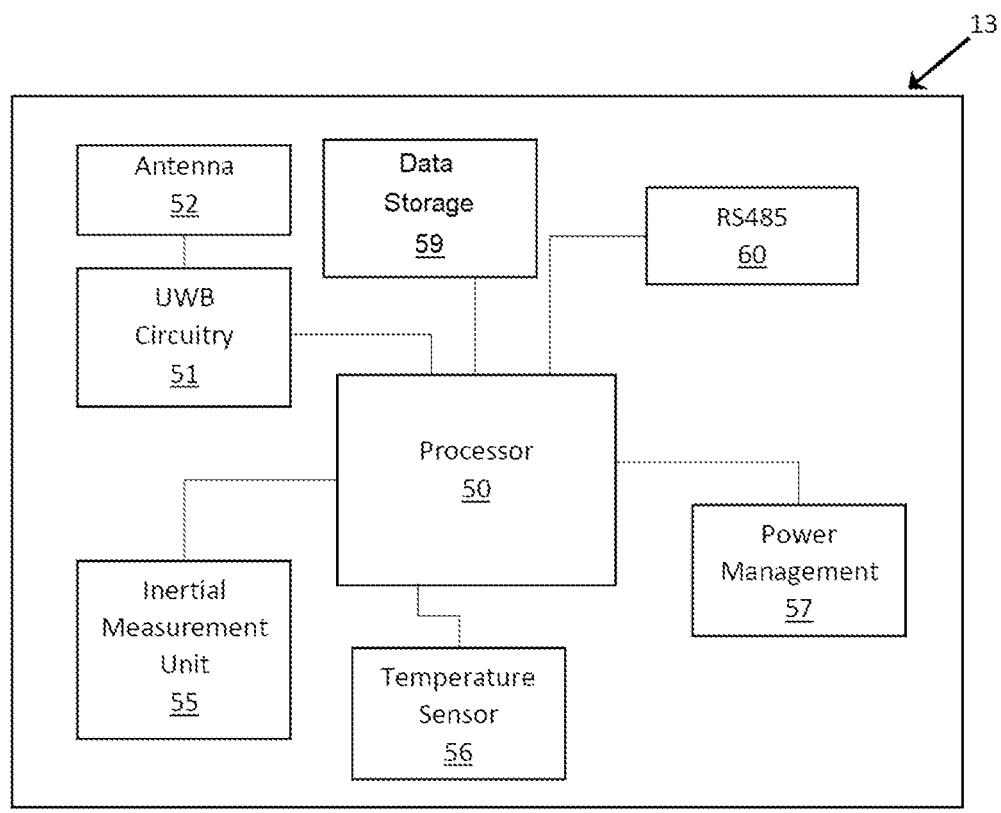
FIG. 5B illustrates a block diagram of an exemplary remote float device.

FIG. 5B illustrates an exemplary UWB positioning remote float device 13 having a wired power connection. In this embodiment, there may be no need for a battery because power may be provided over the wired communication 60 link. In one embodiment, the wired communication link 60 may be a RS485, and may be used to communicate with the anchor device(s) 14.

Figure 5C:
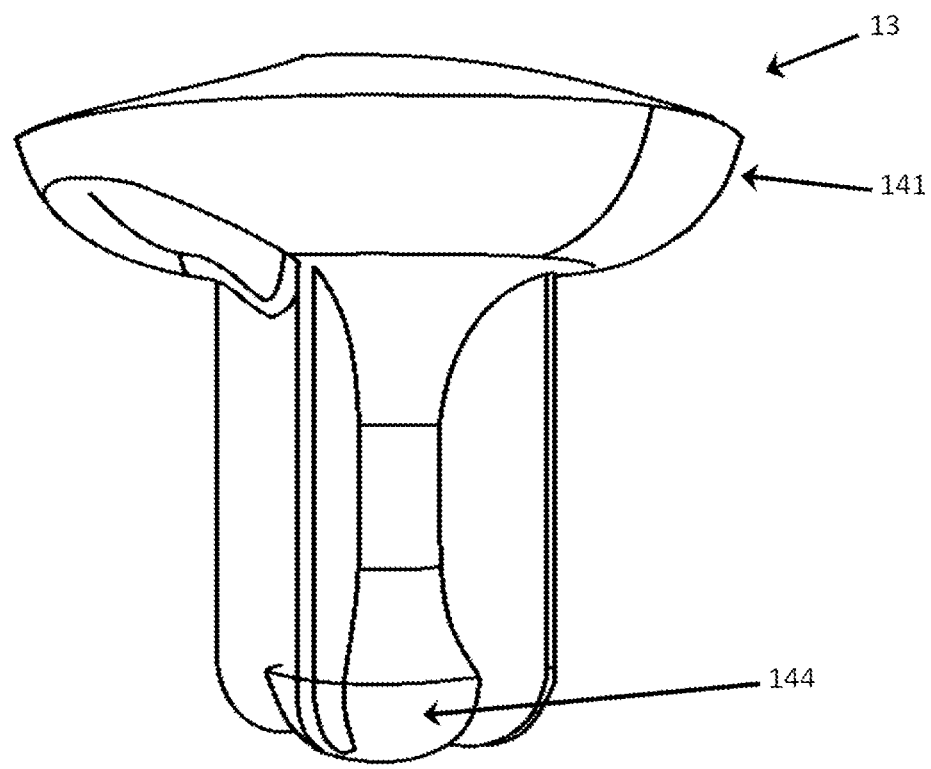
FIG. 5C illustrates a perspective view of an exemplary remote float device.
Figure 5D:
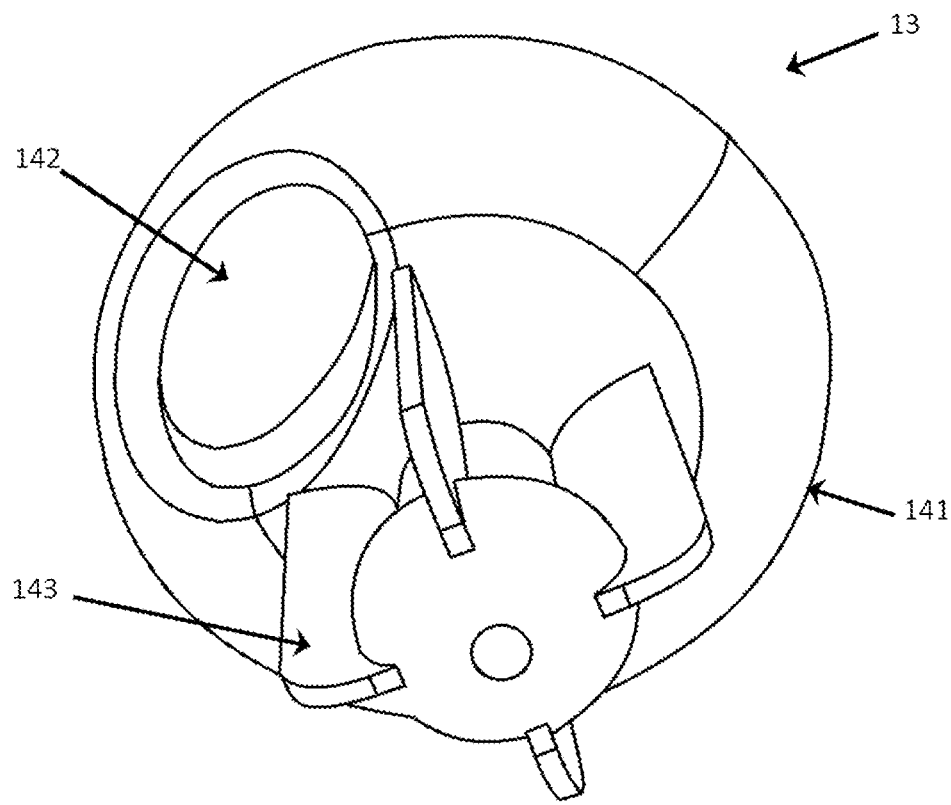
FIG. 5D illustrates a bottom perspective view of an exemplary remote float device.

FIGS. 5C and 5D illustrate perspective views of an exemplary UWB positioning remote float device 13. The remote float device 13 may be formed of an air-tight housing 141 which is buoyant in fluid. Additionally, the air-tight housing 141 may be made of, or coated in, a chemical resistant non-stick material to prevent corrosion and adhesion of foreign material. The remote float device 13 may also include one or more printed circuit boards (PCB) seated within the housing 141, a capturing ring 142 for use with a guide rod 114, stabilizing fins 143 to dampen movement, a counter-weight 144 to ensure proper orientation of the remote float device 13 in fluid, and a UWB antenna, or UWB antenna array. The UWB antenna, or UWB antenna array, may be mounted in a multitude of different orientations within the housing 141.

Figure 6A:
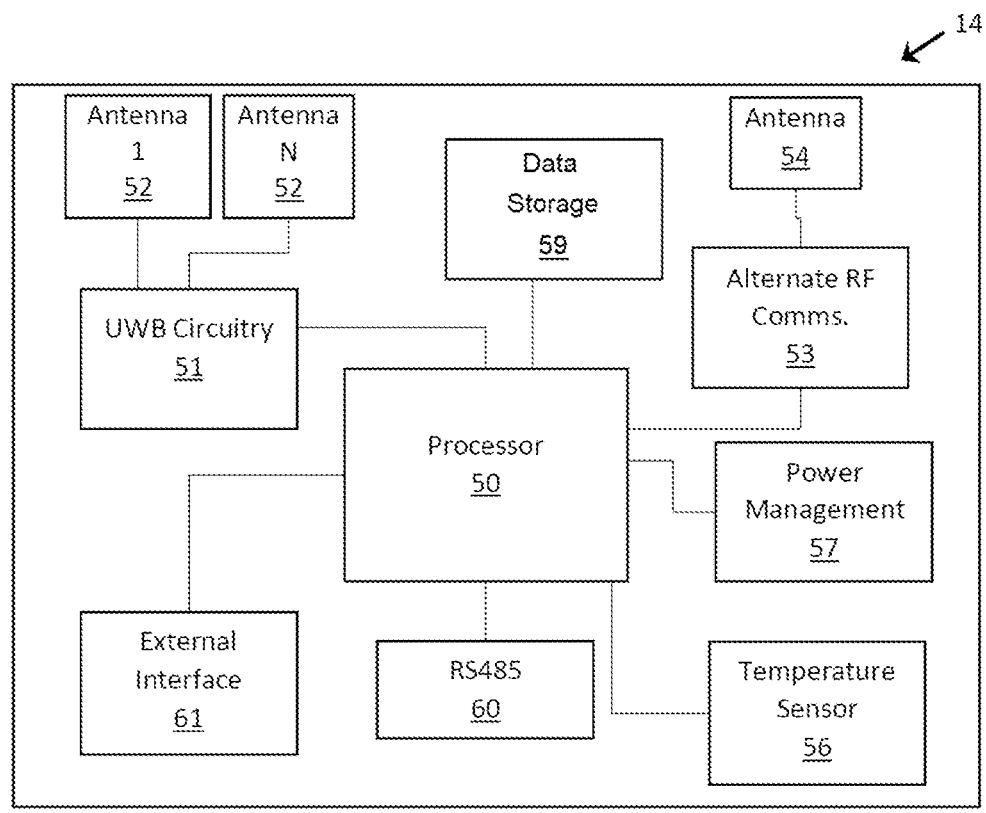
FIG. 6A illustrates a block diagram of an exemplary anchor device.

FIG. 6A illustrates an exemplary UWB positioning anchor device 14 having a wired power connection. The anchor device 14 may include, at least, a processor 50 operably coupled to: UWB circuitry 51 connected to multiple UWB antennas (1, N) 52; alternative RF communications 53 connected to an antenna 54; a temperature sensor 56; power management 57, wired communication link 60; and external interface 61. The anchor device 14 may include one or more antennas 52, depending on whether TWR, TDoA, or TWR+PDoA mode is utilized. The UWB circuitry 51 is connected to the plurality of antennas 52, allowing the calculation of position in multiple dimensions. The UWB circuitry 51 may contain RF components, ICs, and passive components and/or a module to implement an UWB receiver or transceiver. The alternate RF communications 53 may contain RF components, ICs, and passive components and/or a module to implement an alternate RF communications transceiver, such as, but not limited to, a Wi-Fi, BLE, and/or sub-GHz transceiver. The alternate RF communications 53 transceiver may also be used as an additional RF communication link to remote float devices 13, external control systems, smartphones, etc. The wired communication link 60 (RS485) may be used to communicate with wired remote float devices 13. The external interface 61 may be used to indicate fluid level and/or system status and may also interface with an external control system. The external interface 61 may include 4-20 mA outputs, 0-5V outputs, contact closure outputs, and/or communication interfaces, for example. The temperature sensor 56 may be used to compensate for the effects of temperature on individual components in the system or in calculations performed in the processor 50. The power management 57 ensures the other components in the system receive adequate power. The power management 57 may also receive its power from an external wired power supply. The processor 50 may be suitable for executing algorithms and/or processing data in accordance with operating logic.

Figure 6B:
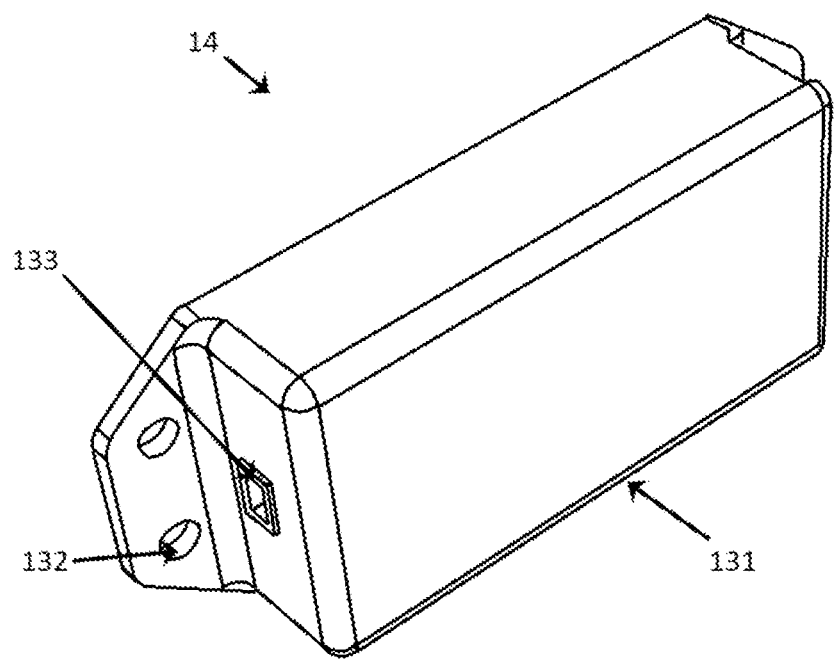
FIG. 6B illustrates a perspective view of an exemplary anchor device.

FIG. 6B illustrates a perspective view of an exemplary UWB positioning anchor device 14 configured for a wired power connection. The anchor device 14 may include, at least, a water-tight housing 131, mechanical mounting features 132, magnetic mounting features, weatherproof cable port or jack 133, one or more printed circuit boards (PCB), and a UWB antenna, or UWB antenna array. The UWB antenna, or UWB antenna array, may be mounted in a multitude of different orientations within the housing 131.

A pump control system 76 may also be used in combination with the fluid level measuring devices, systems, and methods herein. The pump control system 76 may control and configure the fluid measuring systems herein and may interface these fluid level measuring systems with an external subsystem, such as a gauge, pumps, a pump controller, a remote monitoring system 94, and/or an alarm. In some embodiments, the systems herein may provide fluid level management. In this embodiment, the system may be programmed with a predetermined threshold so that when fluid level reaches the predetermined threshold, or predetermined range, action may be taken to manage the fluid level, such as turning 'on' or activating pumps 74, 75, & 84, and/or activating a pump control system 76, as will be described with reference to FIGS. 7 and 8 below. Additionally, the pump control systems 76 herein may operate in either a pump up, or a pump down, manner.

Figure 7:
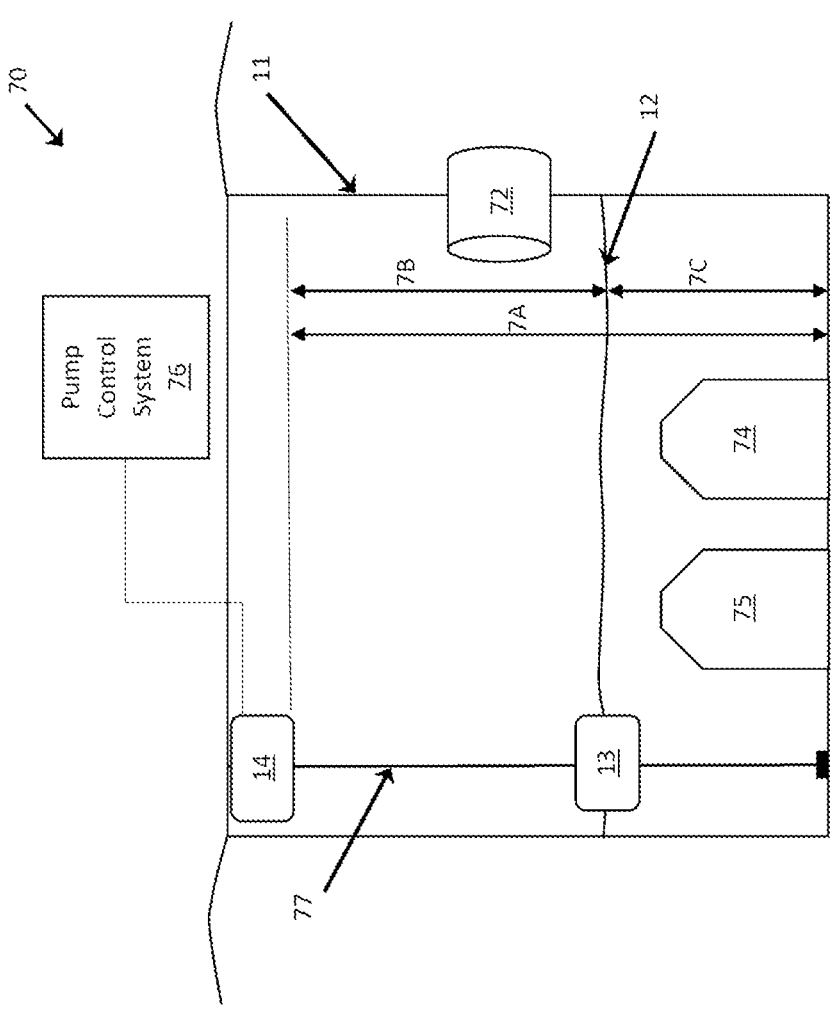
FIG. 7 illustrates a diagram of an exemplary system for measuring fluid level in a wastewater well using UWB positioning.

FIG. 7 illustrates an embodiment of a system for determining fluid level 12 in the wet well 11 of a wastewater lift station 70 using UWB positioning in TWR mode. In this embodiment, a wastewater lift station 70 may include an underground wet well 11 having an inlet pipe 72, which fills the wet well 11 with wastewater/fluid 12. The anchor device 14 may be in a fixed position at the top of the wet well 11.

A battery-powered remote float device 13 may be floating on the surface of the wastewater/fluid 12 while being tethered to the weighted guide cable 77. The weighted guide cable 77 allows the remote float device 13 to freely float up and down with the level of the wastewater/fluid 12, while still preventing the remote float device 13 from moving to an undesirable position within the wet well 71. In other embodiments, a rigid guide rod or pipe may serve the same purpose as the weighted guide cable 77. The battery-powered remote float device 13 may operate in TWR mode and allow the anchor device 14 to calculate the wastewater/fluid 12 level as previously described with reference to FIG. 1. The anchor device 14 may be continually outputting the measured level of the wastewater/fluid 12 (shown as dimension 7C) to the pump control system 76. When the wastewater/fluid level 12 is at a configured level, at least one of the two pumps 74, 75 may be turned on by the pump control system 76 to pump the wastewater/fluid 12 out of the wet well 11 to a higher elevation for ultimate treatment at a wastewater treatment plant. When the wastewater/fluid 12 level (shown as dimension 7C) drops to a specific predetermined level within the wet well 11, the pumps 74, 75 may then be turned off by the pump control system 76.

In an alternative embodiment, which may be applied to any of the systems described herein, the pump control system 76 may use the remaining height within the container (shown as dimension 7B) as an input to control fluid level 12 within a container 11. In this case, the remaining height within the container (shown as dimension 7B) is an input to the pump control system 76. This would then negate the need to know the anchor device's 14 height above the bottom of the container 11 (shown as dimension 7A). The pump control system may be configured to monitor the remaining height in the container 11 (shown as dimension 7B) and keep it within a predetermined range, or at a predetermined level. In yet another alternative embodiment, one or more pre-determined levels or ranges can be set as control points regardless of the depth or remaining height.

Figure 8:
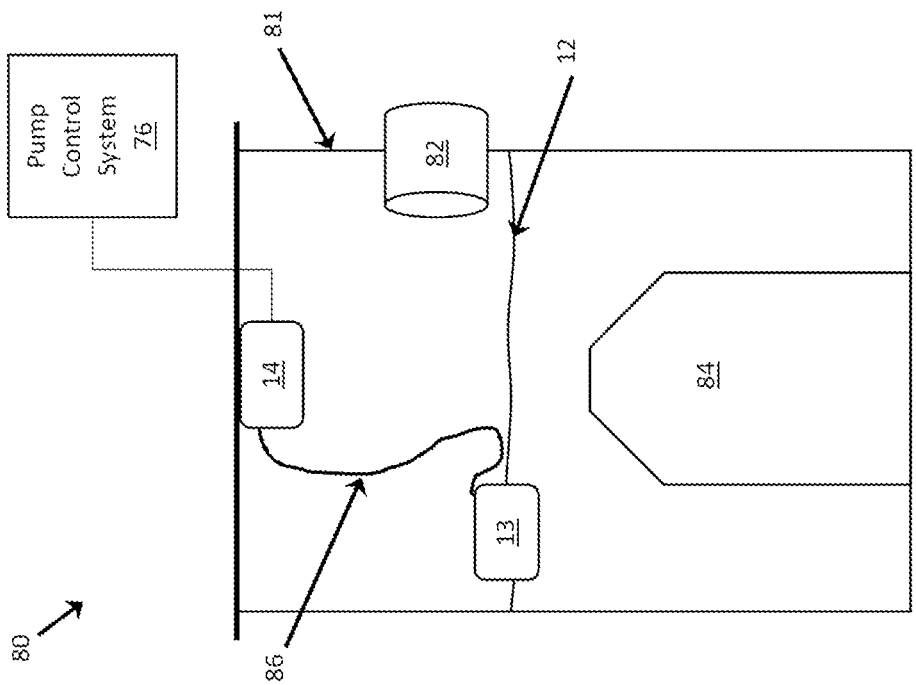
FIG. 8 illustrates a diagram of an exemplary system for measuring fluid level in a sump pump pit using UWB positioning.

FIG. 8 illustrates an embodiment of a system for determining fluid level 12 in the pit 81 of a basement sump pit 80 using UWB positioning in TWR+PDoA mode. A basement sump pit may include a wet well or pit 81, which is usually underground in the basement of a home. An inlet pipe 82 fills the pit 81 with groundwater/fluid 12. The anchor device 14 is mounted in a fixed position at the top of the pit 81. A wired remote float device 13 is floating on the surface of the groundwater/fluid 12, while still being loosely tethered to the anchor device 14 with a cable 86. The cable 86 may provide both power and a wired communication link between the remote float device 13 and the anchor device 14. The wired remote float device 14 may operate in TWR+PDoA mode and allow the anchor device 14 to calculate fluid level as previously described with reference to FIG. 4. The anchor device 14 may continually output the measured level of the groundwater/fluid 12 to the pump control system 76. When the groundwater/fluid 12 level is at, or within, a predetermined range, the pump 84 may be turned on by the pump control system 76 to pump the groundwater/fluid 12 out of the pit 81 and outside of the home. When the groundwater/fluid 12 level within the pit 81 drops to a determined level, or range, the pump 84 may be turned off by the pump control system 76.

Figure 9:
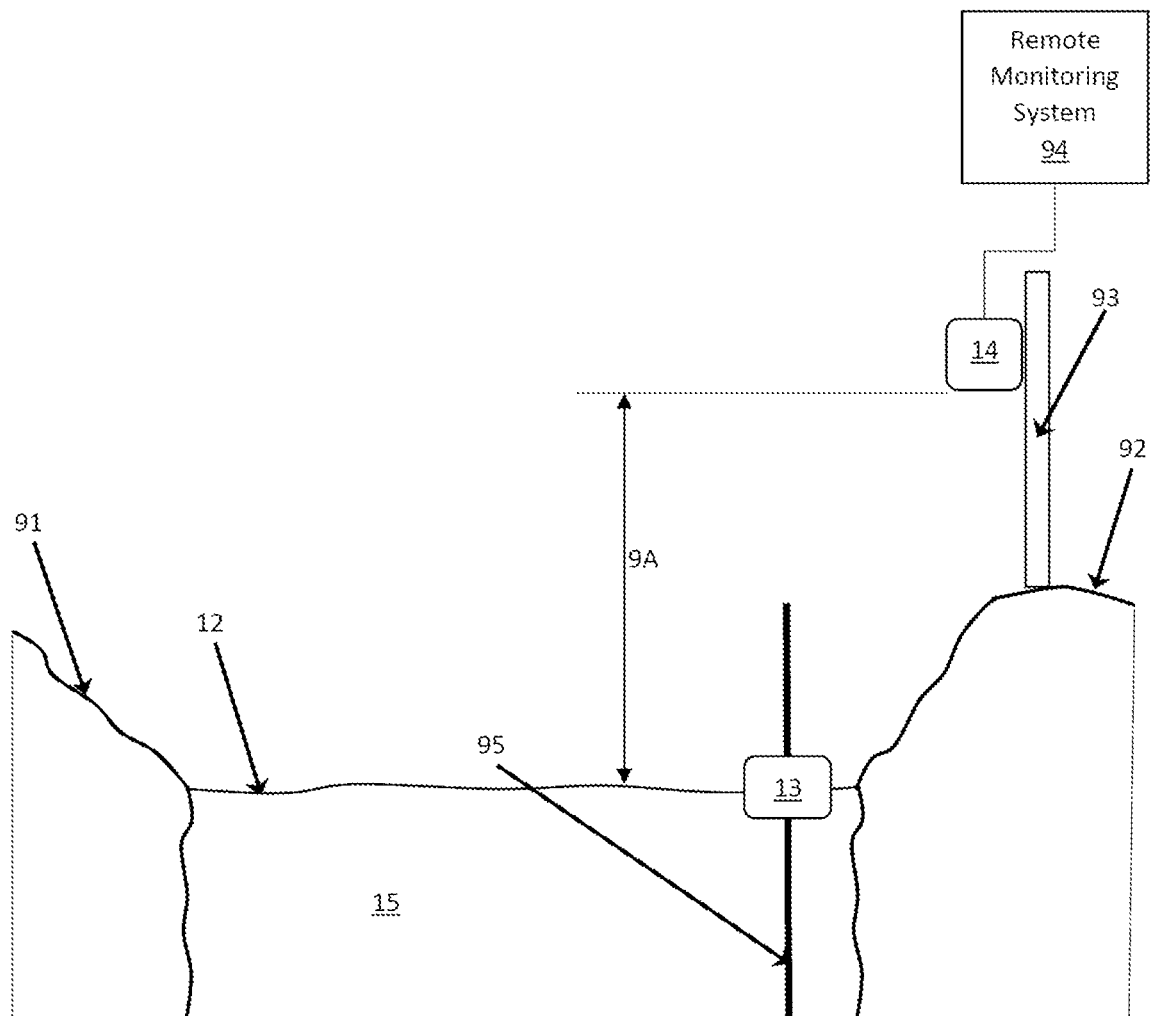
FIG. 9 illustrates a diagram of an exemplary system for measuring fluid level in a river using UWB positioning.

FIG. 9 illustrates an embodiment of a system for monitoring fluid level 12 in a river 15 using UWB positioning in TWR+PDoA mode. The river water 15 is generally contained within the two opposing banks 91, 92. The anchor device 14 may be in a fixed position mounted to a pole 93 on one bank 92 of the river 15. A battery-powered remote float device 13 may be floating on the surface of the river water/fluid 12, while being tethered to a guide rod 95 that is driven into the river bottom. The guide rod 95 may allow the remote float device 13 to freely float up and down with the fluid level 12 of the river 15, but still prevents the remote float device 13 from floating away. The battery-powered remote float device 13 may operate in TWR+PDoA mode and allow the anchor device 14 to calculate the position of the remote float device 13 in multiple dimensions. Knowing the remote float device's 13 position relative to the anchor device 14 allows for calculation of the level of the river water/fluid 12 (shown as dimension 9A). The anchor device 14 may continually output the measured level of the river water/fluid 12 to a remote monitoring system 94. The remote monitoring system 94 may be configured to send alerts if the change in river water/fluid 12 level passes a predetermined threshold, such as to provide notification of flood conditions or container overflow.

Figure 10:
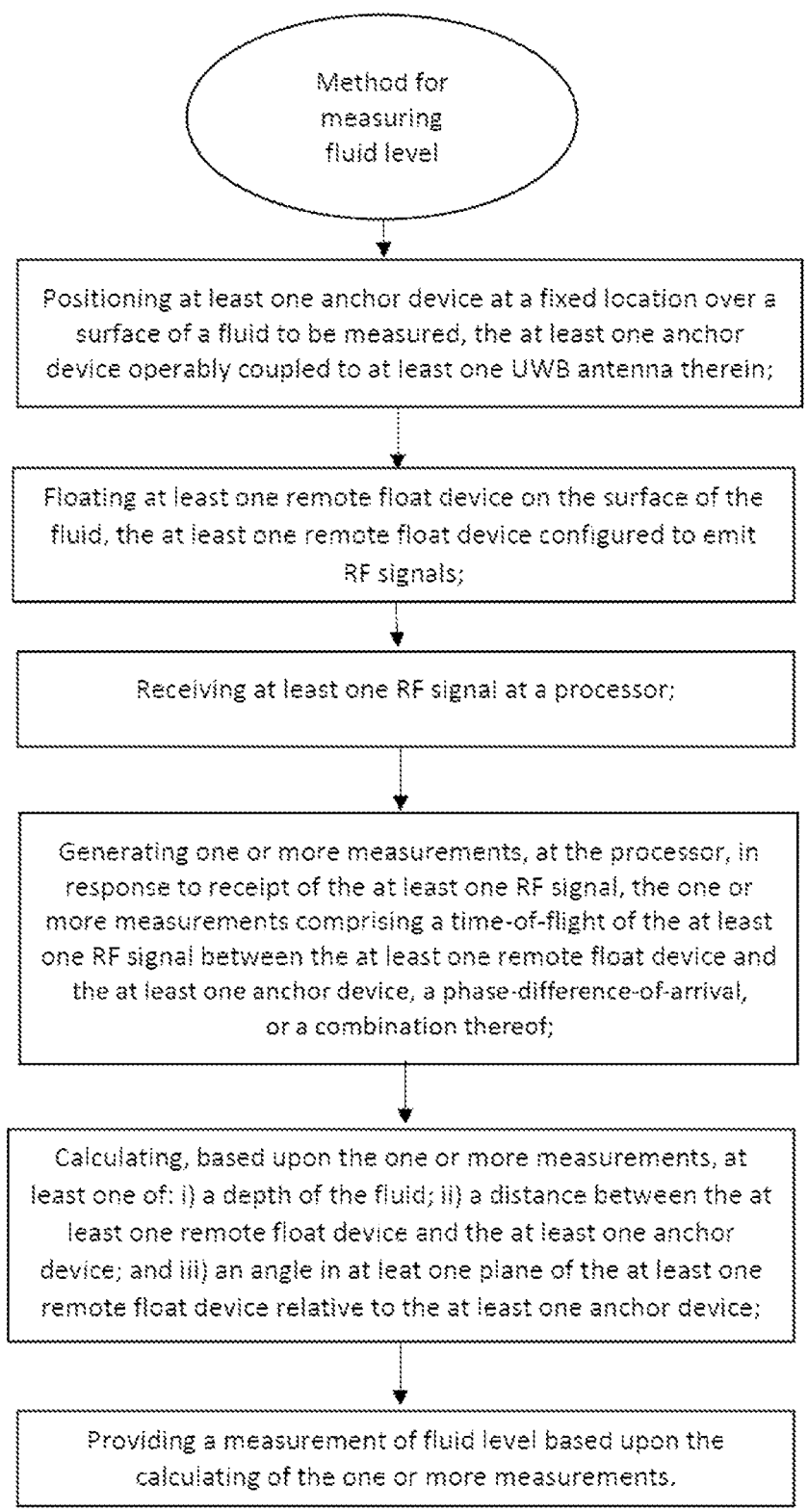
FIG. 10 illustrates an exemplary method of measuring fluid level using UWB positioning.

FIG. 10 illustrates an exemplary embodiment of a method for measuring fluid level using UWB positioning or localization. The method may include positioning at least one anchor device 14 at a fixed location over a fluid's 12 surface, with the at least one anchor device 14 having, and/or operably coupled to a UWB antenna, or UWB antenna array. At least one remote float device 13 may also be floating in the fluid 12 and configured to emit RF signals. The anchor device 14 and/or a remote process, and/or a processor within the anchor device 14 may then receive at least one of the RF signals emitted by the remote float device 13. The method may further continue by generating one or more measurements in response to receipt of the at least one RF signal between the at least one remote float device and the at least one anchor device, a phase-difference-of-arrival (PDoA) or a combination thereof. The method may further continue by calculating, based upon the one or more measurements, at least one of: i) level of the fluid; ii) a distance between the at last one anchor device and the at least one remote float device; and iii) an angle of the at least one remote float device. The method may conclude with providing a measurement of the fluid level based upon the calculating of the one or more measurements.

FIG. 11 illustrates an exemplary logic flow diagram for a smartphone application that may communicate with a system for measuring fluid level using UWB positioning. Once an anchor device 14 is mounted in a fixed position, the system may be configured to start. The first step may involve the user launching a custom-developed computer and/or smartphone application. The application may establish a communications link with the anchor device 14 using the alternate RF communication link 53. The user may then be required to take action to put the anchor device 14 in configuration mode, so the alternate RF communication link 53 becomes active. This communication link is secured using industry standard encryption and security practices. After the communication link is established, configuration parameters may then be entered in the computer and/or smartphone application and transferred to the anchor device 14. The first configuration parameter in this embodiment may be the position of the anchor device 14 within the fluid container 11. One possible method of specifying the anchor device's 14 position is by using X and Y dimensions relative to the center the container 11, and a Z dimension, which is the height of the anchor device 14 above the bottom of the container 11. Next, a user may then determine which external interface(s) 61 should be enabled. The user may be able to select and enable interfaces such as 4-20 mA outputs, 0-5V outputs, simple contact closure outputs, and communication interfaces, for example. The user may then pair any number of remote float devices 13 to be used within the system. Pairing is accomplished by entering one or more unique identification codes (IDs) of the remote float devices 13 into the computer and/or smartphone application. This process may be aided by allowing the user to scan a barcode on the exterior of the remote float device 13 with the smartphone's camera, or by scanning an NFC tag within the remote float device 13, with the smartphone's NFC transceiver. Once all configuration parameters are entered, the communication link is closed, and the configuration process is ended.

FIG. 12 illustrates an exemplary logic flow diagram for a possible communication exchange between a remote float device 13 and an anchor device 14. In general, the remote float device 13 may initiate communication whenever a trigger criteria is satisfied or met. A trigger criteria may include a rule by which one or more configured setting(s) are compared against real-time measurements or state. For example, the remote float device 13 may initiate communication in response to receipt of a message generated by the anchor device 14 or another remote float device, movement of the remote float device 13, passage of a predetermined time interval or time of day, diagnostic events, low-battery conditions, high-level or low-level detection, etc. Another wake-up reason may be an IMU 55 event, and/or other auxiliary sensor input event, that may indicate a stuck float condition, a rapidly changing fluid level, or turbulence on the surface of the fluid. Furthermore, diagnostic events such as battery health state changes, temperature state changes, and other faults may also trigger a wake-up event.

After wake-up of the remote float device 13, the remote float device 13 first transmits its current state to the anchor device 14. This state information may include, but is not limited to, IMU readings, battery condition, wake-up reason, and device information such as firmware versions. The data may be transmitted over one or more RF links in the system for wireless remote float devices 13 and/or over communication links such as RS485 for a wired remote float devices 13.

Regardless of the communication link medium, all data over the link may be secured using industry standard encryption and security practices. Once the remote float device's 13 status is transmitted, the remote float device 13 emits at least one UWB RF signal to initiate one of the operating modes (TDoA, TWR, or PDoA) with the anchor device 14. The anchor device 14 then calculates the level of the fluid 12. When a new fluid level is calculated, any configured external interfaces are updated so any external control systems can act on the new fluid level. Finally, the anchor device 14 may then transmit a new remote float device 13 configuration to be used during the next exchange. This configuration may include wake interval, inertial measurement unit reading thresholds for wake-up, and duration of UWB signal emission. Once the configuration is transmitted and acknowledged, the float device goes to sleep.

The dynamic configuration of the remote float device 13 allows the anchor device 14 to control how often the remote float device 13 wakes up. For instance, if the fluid level is changing rapidly, the system can be configured for a shorter remote float device 13 sleep interval to sample the fluid level more often, which allows for higher resolution control of the fluid level. During periods where the fluid level is not changing, the sleep interval may be configured to be longer to conserve power.

UWB receivers and/or transceivers are offered by semiconductor vendors such as NXP and Qorvo, which utilize advanced techniques to ensure robust performance in environments where RF reflections may be problematic, such as near fluid. RF reflections off objects and surfaces in an environment can cause erroneous distance and angle calculations in UWB applications. High receiver sensitivity and high-speed signal processing algorithms may be used to detect RF reflections and reject them. The transmitting power of an UWB transceiver may be lowered to reduce reflections and be automatically tuned for container size with intelligent algorithms. Additionally, RF performance measurements such as received signal strength and/or signal-to-noise ratio may be used to detect RF reflections or obstructions that may affect performance.

The embodiments described herein illustrate how the present invention provides wide-range fluid measure capability and can measure the entire practical depth and/or level of fluid. The use of UWB RF for distance and position measurements exempts the need for calibration because changes in the environmental conditions such as the presence of dust and water vapor will have a negligible effect on accuracy. UWB technology is robust and will not suffer from inaccuracies caused by RF reflections. Furthermore, this system does not have any moving parts requiring servicing, nor any orifices prone to clogging, etc.

The processor and/or controller described herein may be in communication with memory and additional elements such as the UWB, alternative RF communications, power management, RS485, external interface(s), etc. Examples of the processor may include, but are not limited to, a general processor, a central processing unit, logical CPUs/arrays, a microcontroller, an application specific integrated circuit (ASIC), a digital signal processor, a field programmable gate array (FPGA), and/or a digital circuit, analog circuit, or some combination thereof.

Alternatively, or in addition, the processor and/or controller may be one or more devices operable to execute logic. The logic may include computer executable instructions or computer code stored in memory that when executed by the processor, cause the processor to perform the operations described for the anchor device(s), float device(s), and/or the system. The computer code may include instructions executable with the processor and/or controller.

Memory may be any device for storing and retrieving data or any combination thereof. The memory may include non-volatile and/or volatile memory, such as a random-access memory (RAM), a read-only memory (ROM), an erasable programmable read-only memory (EPROM), or flash memory. Alternatively, or in addition, the memory may include a solid-state drive or any other form of data storage device. Memory (as described above) is generally referred to herein as data storage 59.

The "blocks" in the figures and related discussion may refer to hardware, or a combination of hardware and or software. For example, a block may refer to memory, a processor and/or instructions executable by the processor. Alternatively, or in addition, the blocks may refer to circuitry.

At least some of the system and its logic and data structures may be stored on, distributed across, or read from one or more types of computer readable storage media (for example, as logic implemented as computer executable instructions or as data structures in memory). Examples of the computer readable storage medium may include a hard disk, a flash drive, a cache, volatile memory, non-volatile memory, RAM, flash memory, or any other type of computer readable storage medium or storage media. The computer readable storage medium may include any type of non-transitory computer readable medium.

The processing capability of the system may be distributed among multiple entities, such as among multiple processors, controllers, and memories, optionally including multiple distributed data acquisition and processing systems. Parameters, databases, and other data structures may be separately stored and managed, may be incorporated into a single memory or database, may be logically and physically organized in many different ways, and may implemented with different types of data structures such as linked lists, hash tables, or implicit storage mechanisms. Logic, such as programs or circuitry, may be combined or split among multiple programs, distributed across several memories and processors, and may be implemented in a library, such as a shared library (for example, a dynamic link library (DLL).

Furthermore, and in at least some embodiments, exemplary systems of the present disclosure are configured to capture two-way communication of each device 13, 14 within said system, such as between the anchor devices 14 and remote float devices 13. As such, and in various embodiments, RF transceivers 53 used in the system, and two-way ranging is used to calculate time of flight. In at least one embodiment, each device 13, 14 within the system comprises a transceiver 53. RF signals, as referenced herein, have data embedded that is used for the time-of-flight calculations (referred to herein as packets). In at least some embodiments, the remote float device 13 comprises a chemical-resistant coating to prevent corrosion and/or adhesion of foreign material thereon. The present disclosure also includes disclosure whereby the processor 50 is configured to adjust the interval at which the RF signals are emitted by the remote float device 13 based on a rate of change of the level of the fluid 12 to optimize battery life. In at least some embodiments, the at least one remote float device 13 or the at least one anchor device 14 is configured to optimize RF transmitting power to reduce reflections and extend battery life.

In at least some embodiments, the processor 50 is further configured to signal a pump control system 76 to pump the fluid in response to remaining space in the container 11 being greater than or less than a threshold value. In at least some embodiments, the processor 50 is further configured to notify an external control system that the level of the fluid 12 has changed. In at least some embodiments, the processor 50 is further configured to notify an external control system in response to receipt of a message from the at least one anchor device 14 or the at least one remote float device 13. In at least some embodiments, the processor 50 is also in operable communication with the at least one anchor device 14 or the at least one remote float device 13 using an alternate RF communications 53 comprising Wi-Fi, BLE, or sub-GHz antenna. In at least some embodiments, the at least one remote float device 13 is further configured to detecting activity of pumps 74, 75 of the pump control system 76 by analyzing acoustic characteristics from a microphone 56 positioned relative to the pumps 74, 75, and transmitting data from the microphone 56 to the processor 50. In at least some embodiments, the at least one remote float device 13 is further configured to operate a pressure transducer 53 to detect a condition of the at least one remote float device 13 as being submerged under the surface of the fluid. In at least some embodiments, the at least one remote float device 13 further comprises at least one auxiliary sensor 56 selected from the group consisting of an accelerometer, a gyroscope, and a magnetometer. In at least some embodiments, the at least one remote float device 13 further comprises an accelerometer, the at least one remote float device 13 further configured to operate the accelerometer to detect a condition of the at least one remote float device 13 as not being level with the surface of the fluid.

In at least some embodiments, the processor 50 is further configured to obtain telemetry data and instruct said telemetry data to be stored within an external data storage system. In at least some embodiments, the telemetry data is selected from the group consisting of fluid level, fluid overflow, fluid temperatures, stored power levels, and microphone data.

While various embodiments of devices and systems and methods for using the same have been described in considerable detail herein, the embodiments are merely offered as non-limiting examples of the disclosure described herein. It will therefore be understood that various changes and modifications may be made, and equivalents may be substituted for elements thereof, without departing from the scope of the present disclosure. The present disclosure is not intended to be exhaustive or limiting with respect to the content thereof.

Further, in describing representative embodiments, the present disclosure may have presented a method and/or a process as a particular sequence of steps. However, to the extent that the method or process does not rely on the particular order of steps set forth therein, the method or process should not be limited to the particular sequence of steps described, as other sequences of steps may be possible. Therefore, the particular order of the steps disclosed herein should not be construed as limitations of the present disclosure. In addition, disclosure directed to a method and/or process should not be limited to the performance of their steps in the order written. Such sequences may be varied and still remain within the scope of the present disclosure.

The invention claimed is:

1. A system for measuring a fluid level, comprising:
at least one remote float device configured to emit at least one radio frequency (RF) signal and configured to float on the surface of a fluid to be measured;
an external data storage system configured to store telemetry data created by the system; and
a processor configured to:
receive at least one RF signal from at least one RF antenna, emitted from the at least one remote float device;
analyze the at least one RF signal from the at least one RF antenna; and
calculate a location of the at least one remote float device based upon the analyzed at least one RF signal, wherein the location of the at least one remote float device corresponds to a level of the fluid;
wherein the telemetry data includes fluid overflow data.

2. The system of claim 1, wherein the telemetry data includes fluid temperature data obtained from a temperature sensor of the at least one remote float device.

3. The system of claim 1, wherein the telemetry data includes stored power level data.

4. The system of claim 1, wherein the telemetry data includes microphone data from a microphone of the at least one remote float device.

5. The system of claim 1, further comprising:
a remote monitoring system configured to send an alert if a change in the level of the fluid passes a predetermined threshold.

6. The system of claim 1, further comprising:
at least one anchor device having at least one RF antenna positioned at a fixed location over the surface of the fluid to be measured.

7. The system of claim 6, further comprising:
a RF communication transceiver operably connected to at least one of the at least one anchor device and/or the at least one remote float device and configured to establish an additional communication link with a third-party device.

8. The system of claim 7, wherein the third-party device comprises a smartphone.

9. The system of claim 7, wherein the third-party device is operable to send configuration information to the RF communication transceiver to modify at least one of fluid level thresholds, communication intervals, and device operating modes.

10. The system of claim 7, wherein operation of the RF communication device requires the at least one anchor device to be placed in configuration mode.

11. The system of claim 1, wherein the telemetry data includes fluid level data, and wherein the processor is further configured to analyze the fluid level data.

12. A system for measuring a fluid level, comprising:
at least one remote float device configured to emit at least one radio frequency (RF) signal and configured to float on the surface of a fluid to be measured; and
a processor configured to:
receive at least one RF signal from at least one RF antenna, emitted from the at least one remote float device;
analyze the at least one RF signal from the at least one RF antenna; and calculate a location of the at least one remote float device based upon the analyzed at least one RF signal, wherein the location of the at least one remote float device corresponds to a level of the fluid;
wherein the at least one remote float device comprises at least one auxiliary sensor selected from the group consisting of a microphone, a pressure transducer, and a camera.

13. The system of claim 12, further comprising:
at least one anchor device having at least one RF antenna positioned at a fixed location over the surface of the fluid to be measured.

14. The system of claim 13, wherein the at least one remote float device comprises a camera used to validate system status and/or fault conditions detected by the at least one anchor device and/or the at least one remote float device.

15. The system of claim 13, wherein the at least one remote float device is dynamically configured to allow the at least one anchor device to control power usage of the at least one remote float device.

16. The system of claim 13, wherein the processor is further configured to measure a time-of-flight of the at least one RF signal between the at least one remote float device and the at least one anchor device.

17. The system of claim 12, wherein the processor is further configured to execute algorithms and/or processing data in accordance with operating logic.

18. The system of claim 17, wherein one algorithm of the algorithms computes a position of the at least one remote float device in multiple dimensions.

19. A system for measuring a fluid level, comprising:
at least one remote float device configured to emit at least one radio frequency (RF) signal and configured to float on the surface of a fluid to be measured;
at least one anchor device having at least one RF antenna positioned at a fixed location over the surface of the fluid to be measured; and
a processor configured to:
receive at least one RF signal from at least one RF antenna, emitted from the at least one remote float device;
analyze the at least one RF signal from the at least one RF antenna; and
calculate a location of the at least one remote float device based upon the analyzed at least one RF signal, wherein the location of the at least one remote float device corresponds to a level of the fluid;
wherein the processor is in operable communication with the at least one anchor device.

* * * * *